US007625960B2

(12) United States Patent
Garner

(10) Patent No.: US 7,625,960 B2
(45) Date of Patent: Dec. 1, 2009

(54) LIME-FREE ADMIXTURE OF COMPOSITIONS FOR HYDRAULIC CEMENTS AND METHODS THEREOF

(76) Inventor: Van Dyke Garner, 1503 E. 6th Ave., Mesa, AZ (US) 85204

( * ) Notice: Subject to any disclaimer, the term of this patent is extended or adjusted under 35 U.S.C. 154(b) by 201 days.

(21) Appl. No.: 11/551,588

(22) Filed: Oct. 20, 2006

(65) Prior Publication Data

US 2007/0049668 A1    Mar. 1, 2007

Related U.S. Application Data

(63) Continuation-in-part of application No. 10/697,222, filed on Oct. 30, 2003, now abandoned.

(51) Int. Cl.
    *C04B 24/00* (2006.01)
(52) U.S. Cl. .................... 524/5; 524/4; 524/8; 524/161
(58) Field of Classification Search .................... 524/4, 524/5, 8, 161
    See application file for complete search history.

(56) References Cited

U.S. PATENT DOCUMENTS

2004/0229978 A1 * 11/2004 Bowe .......................... 524/2

* cited by examiner

*Primary Examiner*—Peter Szekely
(74) *Attorney, Agent, or Firm*—Ivan Mlachak

(57) ABSTRACT

Lime-free admixture compositions comprising a combination of ingredients are disclosed. The ingredients of the lime-free admixture compositions comprise a combination of emulsifiers, toughening resins/plasticizers, adhesive resins, pumping aids for providing lubrication, rheology controllers, water retention agents, water repellants/overcoat finishes, accelerators, liquid adsorbents/water reducers and air entraining agents. The lime-free admixture compositions are total replacements for lime. The ingredients of the lime-free admixture compositions have specific purposes that lead to optimized properties when used in combination with a binder comprising hydraulic cement. The lime-free admixture compositions are non-corrosive, making them safe to use by workers and they have rheological properties that make them suitable for use in various applications including concrete, mortars, grouts and stuccos. The ingredients comprising lime-free admixture compositions are biodegradable and therefore environmentally friendly.

22 Claims, No Drawings

LIME-FREE ADMIXTURE OF COMPOSITIONS FOR HYDRAULIC CEMENTS AND METHODS THEREOF

This is a CIP of application Ser. No. 10/697,222 filed Oct. 30, 2003 now abandoned.

FIELD OF THE INVENTION

This invention relates generally to hydraulis cement admixtures and more specifically to lime-free admixture compositions for hydraulic cements and methods thereof.

BACKGROUND OF THE INVENTION

An admixture is a formulated composition other than a hydraulic cement (or binder), water and aggregates (such as sand and stones) that is used as an ingredient to control setting and early hardening, workability, or to provide additional cementing properties when making hardened binders (e.g., concrete, mortar, stucco or grout). Examples of binders, which are hydraulic cements, include Portland cement, or in combination with gypsum, aluminous cement and pozzolanic cement. Typically, an admixture is added to a batch of a binder immediately before or during mixing with water. Admixtures have generally been used to modify the properties of a binder so that it is more suitable for a particular purpose such as better handling characteristics during processing or for economic reasons. Generally admixtures are provided as single functionality additives that are added to improve a particular property of a hardened binder. Admixtures have been used to achieve certain structural improvements in hardened binders; improved quality of binders through the successive stages of mixing, transporting, applying and hardening of binders; improved processing characteristics especially in emergency situations during binder operations; and in cost reduction.

Admixtures have been available as water-soluble solids or powders that are mixed at the point of usage, or as ready-to-use liquids that are added at bulk blending locations. It has been desirable to provide pre-weighed quantities of admixtures so that the expected properties and performance of the binder batch are met. Small deviations from the recommended level of admixture to binder have been known to deteriorate the properties of the hardened binder, so it is desirable to have admixture compositions that are more forgiving in terms of admixture to binder ratio.

Pre-mixed blends of binder and admixture have been used. They require large quantities of the pre-mixed blends to be transported. It is preferable to be able to add a small quantity of an admixture to a commonly available binder, which is then hardened at a job site.

Even though there are a number of commercial powder and liquid admixtures, many of them have been based on lime-containing blends when used with binders. During handling the use of lime-containing blends has been deleterious to the health of workers. In addition, some lime-free admixtures have been found to provide inadequate weathering and strength properties to hardened binders, as well as inadequate handling characteristics during the processing of a mixture of admixture, binder, aggregates and water.

For the foregoing reasons, a need exists to provide improved lime-free admixture compositions for hydraulic cements and methods thereof. Such compositions must be safe and effective for use by workers and their method of use should preferably be easy to understand, routine and readily adopted. The inventor of this application has discovered admixture compositions and methods for hydraulic cements that meet these needs.

SUMMARY OF THE INVENTION

It is an object of the present disclosure to provide improved lime-free admixture compositions for hydraulic cements.

It is a further object of the present disclosure to provide improved lime-free admixture compositions for hydraulic cements particularly suitable for making mortar and stucco mixtures.

It is a still further object of the present disclosure to provide improved lime-free admixture compositions for hydraulic cements particularly suitable for making stucco mixtures having rheological properties suitable for applying stucco to non-wire mesh wrapped expanded polystyrene substrates.

It is a further object of the present disclosure to provide improved lime-free admixture compositions for hydraulic cements that are biodegradable and safe to use.

It is a yet further object of the present disclosure to provide methods for using improved lime-free admixture compositions for hydraulic cements to make improved masonry compositions including concretes, mortars, stuccos and grouts.

BRIEF DESCRIPTION OF THE PREFERRED EMBODIMENTS

In accordance with one embodiment of the present invention, a lime-free admixture composition for hydraulic cement is disclosed. The lime-free admixture composition comprises, in combination about 0.15 pounds to about 0.3 pounds of a plurality of emulsifiers per 1600 pounds of hydraulic cement, about 0.25 pounds to about 1.25 pounds of a plurality of toughening resins per 1600 pounds of hydraulic cement emulsified by the plurality of emulsifiers and about 0.1 pounds to about 1.6 pounds of a plurality of accelerators per 1600 pounds of hydraulic cement for hardening a mixture comprising hydraulic cement, a plurality of aggregates, water and the lime-free admixture composition.

In accordance with a second embodiment of the present invention, a lime-free admixture composition for hydraulic cement is disclosed. The lime-free admixture composition comprises, in combination a plurality of emulsifiers, a plurality of toughening resins emulsified by the plurality of emulsifiers and a plurality of accelerators for hardening a mixture comprising hydraulic cement, a plurality of aggregates, water and the lime-free admixture composition.

In accordance with a third embodiment of the present invention, a method for using lime-free admixture compositions to make masonry compositions is disclosed. The method comprises the steps of providing a plurality of emulsifiers, a plurality of toughening resins emulsified by the plurality of emulsifiers and a plurality of accelerators for hardening a mixture comprising hydraulic cement, a plurality of aggregates, water and the lime-free admixture composition. The method further comprises the steps of adding a first quantity of water into a mixer; blending a quantity of hydraulic cement with the water in the mixer; blending a quantity of the lime-free admixture composition into the water and hydraulic cement in the mixer; blending a first quantity of a plurality of aggregates into the water, hydraulic cement and the lime-free admixture composition in the mixer; blending a second quantity of water to the mixer; blending a second plurality of aggregates to the mixer and mixing the mixture comprising water, the hydraulic cement, the admixture composition and the plurality of aggregates in the mixer for a period of time of less than about 4 minutes.

The foregoing and other objects, features, and advantages of the invention will be apparent from the following, more particular description of the preferred embodiments of the invention.

DETAILED DESCRIPTION OF THE PREFERRED EMBODIMENTS

The lime-free admixture compositions of the present disclosure comprise a combination of ingredients. The lime-free admixture compositions are 100% replacements for lime. The ingredients of the lime-free admixture compositions have specific purposes that lead to optimized properties when used in combination with a binder.

In this description a binder is a hydraulic cement of the type noted supra, that is at least gypsum, Portland cement, aluminous cement and pozzolanic (fly ash) cement and combinations thereof. Various grades of the binder may be effectively used with lime-free admixture compositions of this disclosure. For example Portland cement is available as Type I-V. It is understood that mixtures of binders may also be used with the lime-free admixture compositions. In addition, various aggregates may be used with lime-free admixture and binder mixtures. Aggregates include various grades of fillers, sands and rocks commonly used in the construction industry.

The lime-free admixture compositions of this disclosure are dry powders suitable for facile transportation. They are not hygroscopic, and therefore do not entrain moisture or mold during transportation. The lime-free admixture compositions readily mix with binders and form suitable slurries when water is added. In comparison to liquid admixtures, lime-free admixture compositions provide more coverage resulting in less cost per volume of material used, no spoilage, no considerations due to weather conditions, such as freezing temperatures, less need for storage space and lower freight costs.

The lime-free admixture compositions of this disclosure are non-corrosive, making them safe to use by workers and they have rheological properties that make them suitable for use in various applications. The surfactants and the emulsifiers of the lime-free admixture compositions of this disclosure are biodegradable.

The lime-free admixture compositions of this disclosure provide higher compressive strength, greater toughness leading to less crack formation and less shrinkage, greater color fastness and no leaching of ingredients in comparison to lime containing admixtures. When a hardened binder is painted, the lime-free admixture compositions do not burn-out, that is, because there is no lime in lime-free admixture compositions, migration of lime between the hardened binder and the paint is avoided. In comparison, lime-containing admixtures darken paint because of chemical reactions of lime and the paint.

In the specific case of stucco finishes, it is usual practice to apply the stucco binder over a wire mesh and expanded polystyrene substrates, which is mounted on a building frame. Since the wire mesh may corrode, the oxidative corrosion products of the wire mesh may discolor the stucco. The lime-free admixture compositions of this disclosure have no corroding ingredients. In addition, the mixture of lime-free admixture composition added to binder, water and aggregates may be applied directly to non-wire mesh wrapped expanded polystyrene substrates because of their enhanced adhesive and rheological properties, providing a considerable savings in cost of construction.

The lime-free admixture compositions of the present disclosure have extended shelf-lives because they are powders in which the ingredients do not react with one another until activated by water and the binder. The lime-free admixture compositions comprise ingredients that are controlled released for controlled speed of reaction when added to binder and water.

The ingredients of the lime-free admixture compositions of the present disclosure comprise a combination of emulsifiers, toughening resins, adhesive resins, pumping aids for providing lubrication, rheology controllers, water retention agents, water repellants, overcoat finishes, accelerators, liquid adsorbents, water reducers and air entraining agents. Toughening resins may also be plasticizers. An effective lime-free admixture composition comprises at least a combination of a plurality of emulsifiers, a plurality of toughening resins and a plurality of accelerators. The lime-free admixture compositions of this disclosure are environmentally friendly because none of the ingredients contain lime, phosphates, phenols, volatile organic compounds, nitrates or nitrites. The combination of ingredients of lime-free admixture compositions synergistically provides optimum performance when used with a binder and water.

Some emulsifiers (or hydrotopes) used in the lime-free admixture compositions of the present disclosure include anionic surfactants such as a plurality of linear alkyl benzene sulfonate salts of an alkali earth metal cation of the Group I and II elements (including, but not limited to lithium, sodium, potassium, magnesium and calcium) and a plurality of linear alkyl benzene sulfonate salts of a non-metal cation (including, but not limited to ammonium, alkyl ammonium, aryl ammonium, pyridine, pyrrole and piperidine and derivatives of alkyl ammonium, derivatives of aryl ammonium, derivatives of pyridine, derivatives of pyrrole and derivatives of piperidine). Alternatively, anionic surfactants include a plurality of alpha olefin sulfonate salts of an alkali earth metal cation of the Group I and II elements (including, but not limited to lithium, sodium, potassium, magnesium and calcium) and a plurality of alpha olefin sulfonate salts of a non-metal cation (including but not limited to ammonium, alkyl ammonium, aryl ammonium, pyridine, pyrrole and piperidine and derivatives of alkyl ammonium, derivatives of aryl ammonium, derivatives of pyridine, derivatives of pyrrole and derivatives of piperidine). Emuslifiers are used for a variety of purposes including their ability to carry organic chemicals into water to make solutions. CALSOFT® F-90 manufactured by Pilot Chemical Co., CA, U.S.A., NORFOX® 90 manufactured by Norman, Fox & Co., CA, U.S.A., and WITCONATE® 90 FLAKE, manufactured by Witco Corp., CA, U.S.A. are examples of a sodium salt of dodecylbenzene sulfonate available as a biodegradable solid. Sodium alpha olefin sulfonate salts are available as biodegradable powders manufactured by a number of producers including Witco Co., CA, U.S.A and Stepan Co., IL, U.S.A. An example of a non-ionic emulsifier comprising a mixture of alkyl aryl polyethoxylates, compounded silicone and linear alcohol (CA Reg. No. 2935-50142) suitable for use in lime-free admixture compositions is R-11® SPREADER ACTIVATOR, manufactured by Wilbur-Ellis Co., CA, U.S.A. It is understood that other biodegradable surfactants including cationic, amphoteric and non-ionic surfactants that can act as emulsifiers of organic polymers into water are equivalents that can be used in lime-free admixture compositions. A plurality of linear alkyl benzene sulfonate salts of an alkali earth metal cation and a plurality of linear alkyl benzene sulfonate salts of a non-metal cation, as well as a plurality of alpha olefin sulfonate salts of an alkali earth metal cation and a plurality of alpha olefin sulfonate salts of a non-metal cation are contemplated emulsifiers, and a plurality of linear alkyl benzene sulfonate salts of alkali earth metal cation and a plurality of linear alkyl benzene sulfonate salts of non-metal cation are most preferred emulsifiers because of their biodegradability. It is understood that biodegradable emulsifiers are most preferred.

Some toughening resins used in lime-free admixture compositions of this disclosure include rubbers such as isoprene polymer, isoprene copolymer and styrene/butadiene/styrene (hereinafter denoted SBS) copolymer, as well as water redispersible polymers such as ethylene/vinyl acetate (hereinafter denoted EVA) copolymers and vinyl acetate/vinyl versatate (hereinafter denoted VA/VV) copolymers. These polymers are thermoplastic materials. The toughening function of these polymers prevents crack growth and shock resistance during and after hardening of the binder and improves abrasion resistance, flexibility and impact resistance in the otherwise brittle binder matrix. The rubbers used in lime-free admixture compositions are in the form of solid crumbs. Granulated crumb form is preferred. Further, it is preferred to use a crumb size corresponding to size 16 mesh sand. This makes for easier dispersion of the rubbers with the above-mentioned emulsifiers in lime-free admixture compositions. SEPTON® 4033 manufactured by Kurary America, Inc., NY, U.S.A. is an example of an isoprene polymer rubber suitable as a toughening resin for lime-free admixture compositions. VECTOR® 2411, manufactured by Exxon Mobil is an example of a SBS copolymer rubber suitable for use as a toughening resin for lime-free admixture compositions. NIPOL® 1401LG (a nitrile polymer rubber crumb), manufactured by Zeon Chemicals, KY, U.S.A. is another example of a rubber suitable for use in lime-free admixture compositions. Mixtures of various rubbers may also be used as toughening resins. It is understood that other rubbers and mixtures having different chemical compositions than those described supra may also be used as equivalents in lime-free admixture compositions. Isoprene polymer rubbers, isoprene copolymer rubbers and SBS copolymers in crumb form emulsified with CALSOFT® F-90 are contemplated rubbers in lime-free admixture compositions.

In order to avoid confusion with any trademark terms, the term vinyl versatate (VV) for purposes of this patent is defined to have the following meaning. VV means a vinyl ester of mixed length carbon chains, wherein the carbon chains include a mixture of C9 to C11 lengths.

VA/VV copolymers and EVA copolymers are available as specially coated latex powders that are redispersible in water and have irreversible film-forming properties after water is removed in formulations made with these copolymers. Examples of VA/VV copolymers suitable for use in lime-free admixture compositions of this disclosure include RHOXIMAT® PAV 29, manufactured by Rhodia PPMC, N.J., U.S.A. and DOW DLP 120, manufactured by Dow Chemical, MI, U.S.A. RHOXIMAT® PAV 29 is a contemplated VA/VV copolymer. Examples of EVA copolymers suitable for use in lime-free admixture compositions include VINNAPAS® RP 140, VINNAPAS® RP 245 and VINNAPAS® RE 5010 N, manufactured by Wacker Polymer Systems LP, MI, U.S.A., DOW DLP 214, manufactured by Dow Chemical, MI, U.S.A and ELVACE® 4085, manufactured by Forbo Adhesives Synthetic Polymers, IL, U.S.A. Combinations of polyvinyl acetate (hereinafter denoted PVA) polymers and copolymers such as DYNO-BOND manufactured by Dyno-Bond, Inc., ON, Canada are also available as specially coated latex powders that are redispersible in water and are suitable for use in lime-free admixture compositions. It is understood that other redispersible copolymers are suitable for use in lime-free admixture compositions. One example of an alternative redispersible copolymer is VINNAPAS® RI 554 Z (a copolymer of ethylene/vinyl chloride/vinyl laurate), manufactured by Wacker Polymer Systems LP, MI, U.S.A.

Isoprene polymer rubbers, isoprene copolymer rubbers, SBS copolymer rubbers, VA/VV copolymers, EVA copolymers, PVA polymers and PVA copolymers also act as adhesives in lime-free admixture compositions of this disclosure. These ingredients promote enhanced adhesion of the binder, water, aggregates and lime-free admixture composition mixtures to substrates such as wire mesh/expanded polystyrene substrates and non-wire meshed/expanded polystyrene substrates as discussed supra in stucco applications of lime-free admixture compositions, as well as for adhering to masonry and wooden building structures. It is understood that a combination of ingredients are used in lime-free admixture compositions.

Pumping aids for controlling rheology and providing lubricity may be ingredients in the lime-free admixture compositions of this disclosure. Pumping aids are particularly important when a mixture of the binder, water, aggregates and the lime-free admixture composition is applied by spray pumping or during the transfer of smaller batches of the mixture from a larger batch using pumping apparatus. Pumping aids thicken the mixture of binder, water, aggregates and the lime-free admixture compositions, increasing the viscosity, thereby reducing de-watering of the mixture during the pumping process. Some pumping aids include polyethylene oxide polymers (e.g. POLYOX® WSR-301 manufactured by Dow Chemical, MI, U.S.A.), hydroxylpropyl methyl cellulose polymers (e.g. METHOCEL® 240, manufactured by Dow Chemical Co., MI, U.S.A. and HPMC MECELLOSE®, manufactured by Samsung Fine Chemical, Ltd., Korea) and hydroxylethyl methyl cellulose polymers (HEMC MECELLOSE®, manufactured by Samsung Fine Chemical, Ltd., Korea). It is understood that there are many other suitable pumping aids for lime-free admixture compositions including, but not limited to polyethylene glycol polymers and copolymers, polyacrylamide polymers and copolymers, xanthan gums and guar gums and their derivatives. POLYOX® WSR-301 having a viscosity in a 1% aqueous solution at 25.degree. C. of 1650-5500 mPa.multidot.s and HEMC MECELLOSE® are contemplated pumping aids in lime-free admixture compositions.

The pumping aids and toughening resins described supra also act as water retention agents. Water retention agents reduce the amount of water that is added to the lime-free admixture composition, binder and aggregates mixture, thereby decreasing shrinkage and enhancing strength of the hardened binder.

In the specific case of stucco applications it is common to apply paint finish over the hardened stucco acting as both water repellant and final overcoat finish. The lime-free admixture compositions of this disclosure include ingredients that provide water repellency and an overcoat finish in-situ when a mixture of the binder, water, aggregates and lime-free admixture composition is hardened. Isoprene polymer rubbers, isoprene copolymer rubbers and SB copolymer rubbers are contemplated water repellants and DYNO-BOND is a contemplated overcoat finish in lime-free admixture compositions.

Accelerators increase the rate of early strength development and shorten the time of setting for the binder, water and lime-free admixture composition mixtures. This is important in controlling workability of these mixtures according to the environmental conditions of application of the mixtures. Lime is commonly used as an accelerator for setting up the binder in stucco applications and is undesirable because of its caustic effects on breathing the powdered product. The lime-free admixture compositions of this disclosure solve this problem. Thiosulfate salts of alkali earth metal cation of Group I and II elements and ammonium cation including ammonium thiosulfate (e.g., distributed as a 60% solution by Expo Chemical Co., Inc., TX, U.S.A., manufactured by Goodpasture, Inc., TX, U.S.A.), sodium thiosulfate (e.g., manufactured by General Chemical Corp., NJ, U.S.A.), lithium thiosulfate, potassium thiosulfate, barium thiosulfate and calcium thiosulfate (e.g., BSP CAPTOR® and BSP CAPTOR® NSF which is a 30% solution of calcium thiosulfate in water, manufactured by Best Sulfur Products, Div. of AgFormulators, Inc., CA, U.S.A. and alternatively manufactured as a 24% water solution by Goodpasture, Inc., TX, U.S.A.) are suitable for use in lime-free admixture compositions. When alkali earth metal and ammonium thiosulfate salts are only commercially available as water solutions, the aqueous alkali earth thiosulfate salts are adsorbed onto finely divided calcium carbonate and the adsorbed thiosulfate salts are further dried in a convection oven so as to incorporate them as powders in lime-free admixture compositions. Calcium thiosulfate is a contemplated alkali earth metal thiosulfate accelerator ingredient in lime-free admixture compositions.

Alternative accelerators perform their function by providing partial cross-linking of the organic chemical components of lime-free admixture compositions of this disclosure or by providing rheological modifications. Suitable cross-linking accelerators include peroxides and azo compounds that produce free radicals that are able to react with the double bonded domains of SBS copolymer and isoprene polymer and copolymer rubbers. Examples of peroxides include dicumyl peroxide (e.g., VAROX® DCP-40C, manufactured by R.T. Vanderbilt Co., Inc., CT, U.S.A., PERKADOX® BC-40B-GR-DD, manufactured by Akzo Nobel Polymer Chemicals, LLC, IL, U.S.A. and LUPEROX® DC99, manufactured by Atofina Chemicals, PA, U.S.A.) and benzoyl peroxide (e.g., PERKADOX® API GRANULAR, manufactured by Akzo Nobel Polymer Chemicals, LLC, IL, U.S.A. and LUPEROX® A98, as well as LUPEROX® A75, manufactured by Atofina Chemicals, PA, U.S.A.). It is understood that other peroxides including but not limited to alkyl and aryl peroxides and hydroperoxides are suitable for use as accelerators in lime-free admixture compositions. Examples of azo compounds include PERKADOX® ACCN chemically known as 1,1'-azo di(hexahydrobenzonitrile), manufactured by Akzo Nobel Polymer Chemicals, LLC, IL, U.S.A. and VA-085, chemically known as 2,2'-Azobis{2-methyl-N-[2-(1-hydroxybuthyl)]propionamide, manufactured by Wako Chemicals U.S.A., Inc., VA, U.S.A. It is understood that other azo compounds are suitable for use as accelerators for lime-free admixture compositions. Dicumyl peroxide is a contemplated cross-linking accelerator for lime-free admixture compositions. It is understood that a cross-linking accelerator may be solely used or used in combination with a thiosulfate salt accelerator in a lime-free admixture composition.

Another type of accelerator useful in lime-free admixture compositions of this disclosure for accelerated hardening of a mixture of binder, water, aggregate and lime-free admixture composition is a buffer acidifier. In addition to the accelerator capability this ingredient is also an air-entraining agent in lime-free admixture compositions. Air-entraining agents entrain microscopic air bubbles into hydraulic cements so as to improve the durability of concrete to moisture cycles of freezing and thawing. Air-entraining agents increase the workability of fresh hydraulic cements while eliminating or reducing segregation and bleeding. An example of a suitable accelerator that is also an air-entraining agent is SUPER SPREAD® 7000, a combination of ingredients comprising aliphatic polycarboxylates, alkylaryl polyoxyethylene ethanol, butyl and isopropyl alcohol, NEODOL® 91-6 and phenyltrimethyl siloxane, manufactured by Wilbur-Ellis Co., CA, U.S.A. Some of the emulsifiers described supra also may function as air-entraining agents in lime-free admixture compositions.

Fillers may also be ingredients of lime-free admixture compositions. Fillers serve several purposes, including their ability to adsorb any liquid ingredients used in lime-free admixture compositions so as to provide lime-free admixture compositions as dry powders. Fillers also are used to control the rheology of binder, water, aggregates and lime-free admixture composition mixtures, so as to improve workability, pumping efficiency and slumping during hardening of the mixtures. Some fillers used in lime-free admixture compositions include Perlite (a naturally occurring siliceous volcanic rock that appears gray-black in its raw ore state, but puffs up like popcorn and appears white when it is quickly heated above 870 degrees Centigrade) ground to 200 mesh size, MICRO-WHITE® 100 CALCIUM CARBONATE, available from IMERYS Performance Minerals, GA., U.S.A. and diatomaceous earth (e.g. CELATOM®-MN33, manufactured by Eagle-Picher Minerals, Inc., NV, U.S.A.).

Colorants such as dyes and pigments may also be added as ingredients of lime-free admixture compositions without deteriorating the performance of binder, water, aggregates and lime-free admixture composition mixtures in unhardened and hardened form. Colorants may be used to avoid the need to paint over finished structures such as stucco, thereby making lime-free admixture compositions a more efficient and economical way of producing stucco.

Table 1 illustrates a list of contemplated combinations of ingredients and ranges of quantities for one example of lime-free admixture compositions. Table 2 illustrates a second list of contemplated combination of ingredients and ranges of quantities for a second example of lime-free admixture compositions. Table 3 illustrates a third list of contemplated combination of ingredients and ranges of quantities for a third example of lime-free admixture compositions. Table 4 illustrates a fourth list of contemplated combination of ingredients and ranges of quantities for a fourth example of lime-free admixture compositions. Table 5 illustrates a fifth list of contemplated combination of ingredients and ranges of quantities for a fifth example of lime-free admixture compositions. Table 6 illustrates a sixth list of contemplated combination of ingredients and ranges of quantities for a sixth example of lime-free admixture compositions. Several of the following tables present amounts of materials in the admixture in two alternative ways: in a percentage amount and in an amount of pounds per 1600 pounds of Hydraulic Cement. The second alternative is presented as a practical manner of duplicating these formulations in a working environment. In certain formulations an individual chemical component may be used for more than one function. When such is the case, a component having multiple functions is present in the formulation in additive amounts for each function. In other words, the chemical component is present in the amount shown for the first function, and in addition beyond that first amount, the chemical component is present in the amount shown for the second function.

It is further noted that certain chemical components, such as (for example) toughening agents, accelerators and surfactants, may be formed through an underlying polymerization reaction. In such an industrial procedure, there may be present in the finished chemical a residual amount of accelerator (or other material) from the polymerization process itself. It is to be appreciated that amounts shown in formulations for an accelerator are thus in addition to any accelerator amount that may be present in a chemical component from the manufacturing process of that component itself. And this is true for other components beyond just accelerators. The amount in the formulation is beyond any amount of material that may be present in other components as a residue from polymerization or manufacturing.

TABLE 1

| Ingredient | Example of Commercial Source | Quantity (%) | Quantity in Pounds per 1600 1 lbs Hydraulic Cement |
|---|---|---|---|
| Sodium dodecylbenzene sulfonate | CALSOFT ® F 90 | About 0.0000937 to about 0.000188 | About 0.15 to about 0.3 |
| Isoprene rubber | SEPTON ® 4033 | About 0.000156 to about 0.0000781 | About 0.25 to about 1.25 |
| Calcium thiosulfate | BSP CAPTOR | About 0.0005 to about 0.001 | About 0.8 to about 1.6 |

TABLE 2

| Ingredient | Example of Commercial Source | Amount (%) | Quantity in Pounds per 1600 lbs Hydraulic Cement |
|---|---|---|---|
| Sodium dodecylbenzene sulfonate | CALSOFT ® F 90 | About 0.0000937 to about 0.000188 | About 0.15 to about 0.3 |
| Isoprene rubber | SEPTON ® 4033 | About 0.0000625 to about 0.00025 | About 0.1 to about 0.4 |
| Vinyl acetate/vinyl versatate copolymer | RHOXIMAT ® PAV 29 | About 0.0000937 to about 0.0005312 | About 0.15 to about 0.85 |
| Polyethylene oxide polymers | POLYOX ® WSR-301 | About 0.0000156 to about 0.0000468 | About 0.025 to about 0.075 |
| Hydroxyl ethyl methyl cellulose polymer | HEMC MECELLOSE ® | About 0.000025 to about 0.0000937 | About 0.04 to about 0.15 |
| Calcium thiosulfate | BSP CAPTOR ® | About 0.0005 to about 0.001 | About 0.8 to about 1.6 |
| Siliceous volcanic rock | 200 mesh Perlite | About 0 to about 0.0025 | About 0 to about 4 |
| Polyvinyl acetate polymers | DYNO-BOND | About 0.00125 to about 0.0025 | About 2 to about 4 |

TABLE 3

| Ingredient | Example of Commercial Source | Amount (%) | Quantity in Pounds per 1600 lbs Hydraulic Cement |
|---|---|---|---|
| Sodium dodecylbenzene sulfonate | CALSOFT ® F 90 | About 0.0000937 to about 0.000188 | About 0.15 to about 0.3 |
| Isoprene rubber | SEPTON ® 4033 | About 0 to about 0.00025 | About 0 to about 0.4 |
| SBS Rubber | VECTOR ® 2411 | About 0 to about 0.00025 | About 0 to about 0.4 |
| Vinyl acetate/vinyl versatate copolymer | RHOXIMAT ® PAV 29 | About 0.0001125 to about 0.000525 | About 0.18 to about 0.84 |
| Polyethylene oxide polymers | POLYOX ® WSR-301 | About 0.0000156 to about 0.0000468 | About 0.025 to about 0.075 |
| Hydroxyl ethyl methyl cellulose polymer | HEMC MECELLOSE ® | About 0.000025 to about 0.0000937 | About 0.04 to about 0.15 |
| Calcium thiosulfate | BSP CAPTOR ® | About 0 to about 0.001 | About 0 to about 1.6 |
| Dicumyl peroxide | VAROX ® DCP-40C | About 0 to about 0.0000937 | About 0 to about 0.15 |
| Siliceous volcanic rock | 200 mesh Perlite | About 0 to about 0.0025 | About 0 to about 4 |
| Polyvinyl acetate polymers | DYNO-BOND | About 0.00125 to about 0.0025 | About 2 to about 4 |

TABLE 4

| Ingredient | Example of Commercial Source | Quantity (%) | Amount in Pounds per 1600 lbs Hydraulic Cement |
|---|---|---|---|
| Sodium alpha olefin sulfonate | WITCO ® | About 0.0000937 to about 0.000188 | About 0.15 to about 0.3 |
| Isoprene rubber | SEPTON ® 4033 | About 0 to about 0.00025 | About 0 to about 0.4 |
| SBS Rubber | VECTOR ® 2411 | About 0 to about 0.00025 | About 0 to about 4 |
| Ethyl vinyl acetate copolymer | ELVACE ® 4085 | About 0.0001125 to about 0.000525 | About 0.18 to about 0.84 |
| Polyethylene oxide polymers | POLYOX ® WSR-301 | About 0.0000156 to about 0.0000468 | About 0.025 to about 0.075 |
| Hydroxyl ethyl methyl cellulose polymer | HEMC MECELLOSE ® | About 0.000025 to about 0.0000937 | About 0.04 to about 0.15 |
| Calcium thiosulfate | BSP CAPTOR ® | About 0 to about 0.001 | About 0 to about 1.6 |
| Dicumyl peroxide | VAROX ® DCP-40C | About 0 to about 0.0000937 | About 0 to about 0.15 |
| Aliphatic polycarboxylates, alkylaryl polyoxyethylene, ethanol, butyl and isopropyl alcohol, NEODOL ® 91-6, and phenyltrimethyl siloxane | SUPER SPREAD 7000 | About 0 to about 0.002 | About 0 to about 3.2 |
| Calcium carbonate | MICRO-WHITE ® 100 calcium carbonate | About 0 to about 0.0025 | About 0 to about 4 |
| Polyvinyl acetate polymers | DYNO-BOND | About 0.00125 to about 0.0025 | About 2 to about 4 |

TABLE 5

| Ingredient | Example of Commercial Source | Quantity (%) | Amount in Pounds per 1600 lbs Hydraulic Cement |
|---|---|---|---|
| Sodium dodecylbenzene sulfonate | CALSOFT ® F 90 | About 0.0000937 to about 0.000188 | About 0.15 to about 0.3 |
| Isoprene rubber | SEPTON ® 4033 | About 0.0001125 to about 0.000781 | About 0.18 to about 1.25 |
| Hydroxyl ethyl methyl cellulose polymer | HEMC MECELLOSE ® | About 0.000025 to about 0.0000937 | About 0.04 to about 0.15 |
| Calcium thiosulfate | BSP CAPTOR ® | About 0 to about 0.001 | About 0 to about 1.6 |
| Polyvinyl acetate polymers | DYNO-BOND | About 0.00125 to about 0.0025 | About 2 to about 4 |

TABLE 6

| Ingredient | Example of Commercial Source | Quantity (%) | Amount in Pounds per 1600 lbs Hydraulic Cement |
|---|---|---|---|
| Sodium dodecylbenzene sulfonate | CALSOFT ® F 90 | About 0.0000937 to about 0.000188 | About 0.15 to about 0.3 |
| Vinyl acetate/vinyl versatate copolymer | RHOXIMAT ® PAV 29 | About 0.0001125 to about 0.000781 | About 0.18 to about 1.25 |
| Hydroxyl ethyl methyl cellulose polymer | HEMC MECELLOSE ® | About 0.000025 to about 0.0000937 | About 0.04 to about 0.15 |
| Calcium thiosulfate | BSP CAPTOR ® | About 0 to about 0.001 | About 0 to about 1.6 |

TABLE 6-continued

| Ingredient | Example of Commercial Source | Quantity (%) | Amount in Pounds per 1600 lbs Hydraulic Cement |
|---|---|---|---|
| Polyvinyl acetate polymers | DYNO-BOND | About 0.00125 to about 0.0025 | About 2 to about 4 |

Tables 1-6 are illustrative of some contemplated combinations of ingredients and ranges of quantities for lime-free admixture compositions, but it is to be understood that any of the commercial sources of ingredients and combinations of mixtures thereof are equivalents. Additionally, where an ingredient has not been included in Tables 1-6 it is to be understood from the discussion supra that the general category of ingredient (e.g. emulsifier, accelerator, adhesive, toughening agent) qualifies as such an ingredient for inclusion in lime-free admixture compositions. Examples include the use of NIPOL® 1401LG (a nitrile polymer rubber crumb) instead of, or, in combination with SEPTON® 4033 (an isoprene rubber crumb) and the use of the azo free radical initiator VA-085, chemically known as 2,2'-Azobis{2-methyl-N-[2-(1-hydroxybuthyl)]propionamide instead of VAROX® DCP-40C chemically known as dicumyl peroxide.

A lime-free admixture comprises about 0.15 pounds to about 0.3 pounds of a plurality of emulsifiers per 1600 pounds of hydraulic cement, about 0.25 pounds to about 1.25 pounds of a plurality of toughening resins per 1600 pounds of hydraulic cement emulsified by the plurality of emulsifiers and about 0.1 pounds to about 1.6 pounds of a plurality of accelerators per 1600 pounds of hydraulic cement for hardening a mixture comprising hydraulic cement, a plurality of aggregates, water and the lime-free admixture composition. The lime-free admixture may further comprise about 0.15 pounds to about 3.2 pounds of a plurality of air entraining agents per 1600 pounds of hydraulic cement for providing microencapsulated air particles in the mixture comprising hydraulic cement, the plurality of aggregates, water and the lime-free admixture composition. Additionally, the lime-free admixture may further comprise about 2 pounds to about 4 pounds of a plurality of overcoat resins per 1600 pounds of hydraulic cement for providing a coating on an outer surface of a hardened product formed from the mixture comprising hydraulic cement, the plurality of aggregates, water and the lime-free admixture composition. The lime-free admixture may further comprise about 0.25 pounds to about 1.25 pounds of a plurality of adhesive resins per 1600 pounds of hydraulic cement for enhancing adhesion of the mixture comprising hydraulic cement, the plurality of aggregates, water and the lime-free admixture composition to a plurality of substrates. Additionally, the lime-free admixture may further comprise less than about 4 pounds of a plurality of adsorbents per 1600 pounds of hydraulic cement for providing a dry lime-free admixture composition when the lime-free admixture comprises liquid ingredients. The lime-free admixture may further comprise less than about 4.5 pounds of a plurality of water retention agents per 1600 pounds of hydraulic cement for reducing the amount of water that is added to the mixture comprising hydraulic cement, the plurality of aggregates and the lime-free admixture composition and less than about 1.5 pounds of a plurality of pumping aids per 1600 pounds of hydraulic cement for providing rheological control of the mixture comprising hydraulic cement, the plurality of aggregates, water and the lime-free admixture composition.

Table 7 illustrates some results for testing of binder, water, aggregates and lime-free admixture composition mixtures. The specific lime-free admixture composition used to obtain the test results of Table 7 is shown in Table 8. The binder used is Type II-V Portland cement, manufactured by Mitsubishi Cement Corp., CA, U.S.A. The test results correspond to applications where lime-free admixture compositions are used to make mortars or to make stuccos. In order to conform to current proportion specification ASTM C-270 Type S/M masonry for mortar, one bag of Portland cement weighing about 94 pounds is mixed with three cubic feet of masonry sand conforming to ASTM C-144. In order to conform to current proportion specification ASTM C-926 Type Portland cement plaster, one bag of Portland cement weighing about 94 pounds is mixed with three cubic feet of plaster sand conforming to ASTM C-897. The physical properties of the binder, water, aggregates and lime-free admixture composition mixtures exceed ASTM standards (see Table 7). Since lime-free admixture compositions accelerate hardening rapidly by reaching temperatures of at least 140.degree. F., hardening rates are correspondingly accelerated as reflected in the data referring to the time of setting using the Gillmore needle method (see Table 7). Test methods used for determining the physical properties in Table 7 are described in ASTM C-270 and ASTM C-926.

In Table 7, physical property data is also shown where the ratio of sand to Portland cement is 3.5:1, which does not conform to the ASTM C-270 and ASTM C-926 standard methods. However, the physical properties of the binder, water, aggregates and lime-free admixture composition mixtures still exceed the requirements of each one of the ASTM C-270 and ASTM C-926 standard methods. This indicates that a workable mortar or stucco may be expected even when an error is made in mixing of sand and cement mixtures and adding the lime-free admixture composition and water to harden the sand and cement binder mixture.

TABLE 7

| Physcial Property | Sand:Cement Ratio | | ASTM Requirement |
|---|---|---|---|
| | 3:1 | 3.5:1 | |
| Air Content, % | 10 | 12 | 8-19 |
| Autoclave Expansion, % | 0.003 | 0.003 | 1.0 Max. |
| Specific Gravity | 2.992 | 2.992 | — |
| Water Retention, % | 78 | 77 | 70 Min. |
| Compressive Strength, psi after 7 days hardening | 2510 | 1550 | 1300 Min. |
| after 28 days hardening | 4060 | 2730 | 2100 Min. |
| Fineness-Residue on #325 Sieve, % | 9.5 | 9.5 | 24 Max. |

TABLE 8

| Ingredient | Example of Commercial Source | Amount (%) | Amount in Pounds per 1600 lbs Hydraulic Cement |
|---|---|---|---|
| Sodium dodecylbenzene sulfonate | CALSOFT ® F 90 | About 0.0000937 to about 0.000188 | About 0.15 to about 0.3 |
| Isoprene rubber | SEPTON ® 4033 | About 0.0001125 to about 0.000781 | about 0.18 to about 1.25 |
| Vinyl acetate/vinyl versatate copolymer | RHOXIMAT ® PAV 29 | About 0.0001125 to about 0.000781 | About 0.18 to about 1.25 |
| Polyethylene oxide polymers | POLYOX ® WSR-301 | About 0.0000156 to about 0.0000468 | About 0.025 to about 0.075 |
| Hydroxyl ethyl methyl cellulose polymer | HEMC MECELLOSE ® | About 0.000025 to about 0.0000937 | About 0.04 to about 0.15 |
| Calcium thiosulfate | BSP CAPTOR ® | About 0.0005 to about 0.001 | About 0.8 to about 1.6 |
| Siliceous volcanic rock | 200 mesh Perlite | About 0 to about 0.0025 | About 0 to about 4 |
| Polyvinyl acetate polymers | DYNO-BOND | About 0.00125 to about 0.0025 | About 2 to about 4 |

A general procedure for using lime-free admixture compositions to make a masonry composition comprises the steps of adding a first quantity of water into a mixer; blending a quantity of hydraulic cement with the water in the mixer; blending the lime-free admixture composition into the water and hydraulic cement in the mixer; blending a first quantity of a plurality of aggregates into the water, hydraulic cement and the lime-free admixture composition in the mixer; blending a second quantity of water to the mixer; blending a second plurality of aggregates to the mixer and mixing the mixture comprising water, the hydraulic cement, the admixture composition and the plurality of aggregates in the mixer for a period of time of less than about 4 minutes.

A contemplated procedure for using lime-free admixture compositions to make a masonry composition comprises the steps of adding about 4 gallons (about 33 pounds) of water into a mortar mixer followed by adding one bag of Portland cement weighing about 94 pounds into the rotating mortar mixer. A further step comprises adding about 0.5 pounds of lime-free admixture composition to the mortar mixer followed by adding about 140 pounds of an aggregate such as plaster sand and a further about 1-gallon (about 8 pounds) of water to the mortar mixer. A further step comprises adding about 140-190 pounds of the aggregate (e.g., plaster sand) to the mortar mixer and rotating the mortar mixer for about 4-5 minutes. The mixing time may be increased for as long as about 7 to 8 minutes depending on the size of the batch of the binder, water, aggregates and lime-free admixture composition that is made. It is understood that the masonry composition may be a concrete composition, a mortar composition, a grout composition or a stucco composition.

Several different procedures may be used to dispense quantities of lime-free admixture compositions. Lime-free admixture compositions may be delivered in bulk form with a scooper having an appropriate volume to provide a correct portion of the lime-free admixture composition for each bag of hydraulic cement. Alternatively, water-soluble bags enclosing a known quantity of lime-free admixture composition may be added to the mixture of water, hydraulic cement and aggregate to make up an appropriate mixture. A further procedure involves pre-blending lime-free admixture compositions into hydraulic cement. The last procedure is not as efficient in terms of bulk shipping requirements as described supra.

The lime-free admixture compositions can be used in a method whereby a concrete-type composition that includes the admixture is applied to a building substrate. For example, a combination of the lime-free admixture composition, hydraulic cement, a plurality of aggregates and water is applied on a substrate as a masonry composition. This masonry composition can act as a finish coat on a structure. Substrates to which the masonry composition can be applied include typical construction materials for walls such as: construction block (e.g. cmu), brick (concrete or clay), wood siding with mesh, steel surfaces with etched surfaces and mesh, concrete walls (tilt-up), sheet rock with mesh, foam board both with mesh and without mesh, and adobe walls.

In summary, lime-free admixture compositions comprise a combination of ingredients. The ingredients of the lime-free admixture compositions comprise a combination of emulsifiers, toughening resins, adhesive resins, pumping aids for providing lubrication, rheology controllers, water retention agents, water repellants, overcoat finishes, accelerators, liquid adsorbents, water reducers and air entraining agents. The lime-free admixture compositions are total replacements for lime. The ingredients of the lime-free admixture compositions have specific purposes that lead to optimized properties when used in combination with a binder comprising hydraulic cement. The lime-free admixture compositions are non-corrosive, making them safe to use by workers and they have rheological properties that make them suitable for use in various applications including concrete, mortars, grouts and stuccos.

While the invention has been particularly shown and described with reference to preferred embodiments thereof, it will be understood by those skilled in the art that the foregoing and other changes in form and details may be made therein without departing from the spirit and scope of the invention. For example, an accelerator such as a calcium salt of carboxylic acids (e.g., calcium formate, calcium acetate and calcium oxalate) may be used in lime-free admixture compositions. Colorants composed of pigments including carbon black, metal oxides (e.g., iron oxide, chromium oxide and titanium oxide) and phthalocyanine dyes may be used in lime-free admixture compositions. Emusifiers based on a plurality of naphthalene sulfonic acid salts are also effective in lime-free admixture compositions. Various synthetic fibers including but not limited to nylons, polyesters, polyethylenes and polypropylenes and aramids, as well as glass fibers may be used as fillers and rheology controllers in lime-free admixture compositions. The rate of hardening of the mixtures of binder, water, aggregates and lime-free admixture composition may be controlled by altering the quantity of accelerators in lime-free admixture compositions and also by the use of retarders in lime-free admixture compositions.

In a further embodiment, the method for using lime-free admixture compositions to make masonry compositions according may further comprise the steps of: adding a first quantity of water into a mixer; blending a quantity of hydraulic cement with the water in the mixer; blending a quantity of the lime-free admixture composition into the water and hydraulic cement in the mixer; blending a first quantity of a plurality of aggregates into the water, hydraulic cement and the lime-free admixture composition in the mixer; blending a second quantity of water to the mixer; blending a second plurality of aggregates to the mixer; and mixing the mixture comprising water, the hydraulic cement, the admixture composition and the plurality of aggregates in the mixer for a period of time of not less than 4 minutes. In this method for using lime-free admixture compositions to make masonry compositions the first quantity of water comprises about 7% to about 8% of the mixture by weight; the quantity of hydraulic cement comprises about 20% to about 23% of the mixture by weight; the quantity of lime-free admixture composition comprises about 0.1% of the mixture by weight; the quantity of the first plurality of aggregates comprises about 30% to about 34% of the mixture by weight; the second quantity of water comprises up to about 2% of the mixture by weight; and the second quantity of the plurality of aggregates comprises about 34% to about 41% of the mixture by weight.

In a further embodiment, the method for using lime-free admixture compositions may also include a step wherein a combination of the lime-free admixture composition, hydraulic cement, a plurality of aggregates and water is applied on a substrate as a masonry composition selected from the group consisting of a concrete composition, a mortar composition, a stucco composition and a grout composition.

In still a further embodiment, the method for using lime-free admixture compositions may also include a step wherein a combination of the lime-free admixture composition, hydraulic cement, a plurality of aggregates and water is applied as a stucco composition directly to expanded polystyrene substrates.

What is claimed is:

1. A lime-free admixture composition for use with hydraulic cement, the admixture which is a dry powder, comprising, in combination: at least one emulsifier selected from the group of surfactants consisting of anionic, cationic, amphoteric and non-ionic, at least one toughening resin selected from the group consisting of isoprene polymer rubbers, isoprene copolymer rubbers, styrene/butadiene/styrene copolymer rubbers and nitrile copolymer rubbers, emulsified by said emulsifier and at least one accelerator wherein said accelerator comprises a thiosulfate salt of a cation selected from the group consisting of lithium, sodium, potassium, barium, calcium and ammonium, for hardening a mixture comprising hydraulic cement, a plurality of aggregates, water and the lime-free admixture composition.

2. The lime-free admixture composition for hydraulic cement according to claim 1 further comprising at least one overcoat resin wherein said overcoat resin comprises a combination of latex polyvinyl acetate polymers and copolymers for providing a coating on an outer surface of a hardened product formed from the mixture comprising hydraulic cement, the plurality of aggregates, water and the lime-free admixture composition.

3. A method for using lime-free admixture compositions to make masonry compositions comprising the steps of: providing at least one emulsifier selected from the group of surfactants consisting of anionic, cationic, amphoteric and non-ionic, at least one toughening resin selected from the group consisting of isoprene polymer rubbers, isoprene copolymer rubbers, styrene/butadiene/styrene copolymer rubbers and nitrite copolymer rubbers emulsified by said emulsifier, and at least one accelerator wherein said accelerator comprises a thiosulfate salt of a cation selected from the group consisting of lithium, sodium, potassium, barium, calcium and ammonium, for hardening a mixture comprising hydraulic cement, a plurality of aggregates, water and the lime-free admixture composition.

4. The method for using lime-free admixture compositions to make masonry compositions according to claim 3 further comprising the steps of: providing at least one air entraining agent selected from the group consisting of aliphatic polycarboxylates, alkylaryl polyoxyethylene ethanol, butyl and isopropyl alcohol, phenyltrimethyl siloxane, a linear alkyl benzene sulfonate salt of an alkali metal cation, a linear alkyl benzene sulfonate salt of a non-metal cation, an alpha olefin sulfonate salt of an alkali metal cation, and an alpha olefin sulfonate salt of a non-metal cation; providing at least one overcoat resin wherein said overcoat resin comprises a combination of latex polyvinyl acetate polymers and copolymers; providing at least one adhesive resin wherein the adhesive resin is selected from the group consisting of isoprene polymer rubbers, isoprene copolymer rubbers, styrene-butadiene-styrene copolymer rubbers, nitrile copolymer rubbers, vinyl acetate/vinyl versatate copolymers, ethyl vinyl acetate copolymers, polyvinyl acetate polymers and polyvinyl acetate copolymers; providing at least one adsorbent wherein the adsorbent is selected from the group consisting of Perlite, calcium carbonate and diatomaceous earth; providing at least one water retention agent wherein said water retention agent is selected from the group consisting of isoprene polymer rubbers, isoprene copolymer rubbers, styrene-butadiene copolymer rubbers, polyvinyl acetate/vinyl versatate copolymers, polyethylene oxide polymers, hydroxylpropyl methyl cellulose polymers, hydroxylethyl methyl cellulose polymers, polyethylene glycol polymers, polyethylene glycol copolymers, polyacrylamide polymers, polyacrylamide copolymers, xanthan gums and guar gums; and providing at least one pumping aid wherein said pumping aid is selected from the group consisting of polyethylene oxide polymers, hydroxylpropyl methyl cellulose polymers, hydroxylethyl methyl cellulose polymers, polyethylene glycol polymers, polyethylene glycol copolymers, polyacrylamide polymers, polyacrylamide copolymers, xanthan gums, guar gums; and
blending the air entraining agent, the adhesive resin, the adsorbent, the water retention agent, and the pumping aid with hydraulic cement, aggregates, sand, and water so as to form a cementitious composition.

5. The method for using lime-free admixture compositions to make masonry compositions according to claim 3 further comprising the steps of: adding a first quantity of water into a mixer; blending a quantity of hydraulic cement with the water in the mixer; blending a quantity of the lime-free admixture composition into the water and hydraulic cement in the mixer; blending a first quantity of a plurality of aggregates into the water, hydraulic cement and the lime-free admixture composition in the mixer; blending a second quantity of water to the mixer; blending a second plurality of aggregates to the mixer; and mixing the mixture comprising water, the hydraulic cement, the admixture composition and the plurality of aggregates in the mixer for a period of time of not less than 4 minutes.

6. The method for using lime-free admixture compositions to make masonry compositions according to claim 5 wherein the first quantity of water comprises about 7% to about 8% of the mixture by weight; the quantity of hydraulic cement comprises about 20% to about 23% of the mixture by weight; the quantity of lime-free admixture composition comprises about 0.1% of the mixture by weight; the quantity of the first plurality of aggregates comprises about 30% to about 34% of the mixture by weight; the second quantity of water comprises up to about 2% of the mixture by weight; and the second quantity of the plurality of aggregates comprises about 34% to about 41% of the mixture by weight.

7. The method for using lime-free admixture compositions according to claim 6 wherein a combination of the lime-free admixture composition, hydraulic cement, a plurality of aggregates and water is applied on a substrate as a masonry composition selected from the group consisting of a concrete composition, a mortar composition, a stucco composition and a grout composition.

8. The method for using lime-free admixture compositions according to claim 6 wherein a combination of the lime-free admixture composition, hydraulic cement, a plurality of aggregates and water is applied as a stucco composition directly to expanded polystyrene substrates.

9. A cementitious composition comprising hydraulic cement and a lime-free admixture composition, which is a dry powder, comprising a blend of 0.15 lbs-0.3 lbs of at least one emulsifier, 0.25-1.25 lbs of at least one toughening resin, and 0.1 lbs-1.6 lbs of at least one accelerator, per 1600 lbs of hydraulic cement for hardening a mixture comprising hydraulic cement, a plurality of aggregates, sand, water, and said lime-free admixture composition;

wherein the emulsifiers are selected from the group consisting of anionic surfactants, cationic surfactants, amphoteric surfactants, and non-ionic surfactants;

wherein the toughening resins are selected from the group consisting of isoprene polymer rubbers, isoprene copolymer rubbers, styrene/butadiene/styrene copolymer rubbers and nitrile copolymer rubbers, emulsified by said emulsifier; and wherein the accelerator is selected from the group consisting of ammonium thiosulfate, sodium thiosulfate, lithium thiosulfate, potassium thiosulfate, barium thiosulfate, calcium thiosulfate, a peroxide free radical initiator, an azo compound free radical initiator, a hydroperoxide free radical initiator, aliphatic polycarboxylates, alkylaryl polyoxyethylene ethanol, butyl and isopropyl alcohol, and phenyltrimethyl siloxane, wherein the amount of accelerator is beyond any amount of accelerator that may be present in the accelerator or other component as a residue of polymerization formation, and wherein a component having multiple functions is present in additive amounts for each function.

10. The cementitious composition according to claim 9 further comprising about 0.15 lbs to about 3.2 lbs of at least one air entraining agent, for providing microencapsulated air particles in the mixture comprising hydraulic cement, the plurality of aggregates, sand, water and the lime-free admixture composition, wherein the air entraining agent is selected from the group consisting of aliphatic polycarboxylates, alkylaryl polyoxyethylene ethanol, butyl and isopropyl alcohol, phenyltrimethyl siloxane, a linear alkyl benzene sulfonate salt of an alkali metal cation, a linear alkyl benzene sulfonate salt of a non-metal cation, an alpha olefin sulfonate salt of an alkali metal cation, and an alpha olefin sulfonate salt of a non-metal cation.

11. The cementitious composition according to claim 9 further comprising about 2.0 lbs to about 4.0 lbs of at least one overcoat resin wherein said overcoat resin comprises a combination of latex polyvinyl acetate polymers and copolymers, for providing a coating on an outer surface of a hardened product formed from the mixture comprising hydraulic cement, the plurality of aggregates, water and the lime-free admixture composition.

12. The cementitious composition according to claim 9 further comprising about 0.25 lbs to about 1.25 lbs of at least one adhesive resin, wherein the adhesive resin is selected from the group consisting of isoprene polymer rubbers, isoprene copolymer rubbers, styrene-butadiene-styrene copolymer rubbers, nitrile copolymer rubbers, vinyl acetate/vinyl versatate copolymers, ethyl vinyl acetate copolymer, polyvinyl acetate polymers and polyvinyl acetate copolymers, for enhancing adhesion of the mixture comprising hydraulic cement, the plurality of aggregates, water and the lime-free admixture composition to a plurality of substrates.

13. The cementitious composition according to claim 9 further comprising less than about 4.0 lbs of at least one adsorbent, wherein the adsorbent is selected from the group consisting of Perlite, calcium carbonate and diatomaceous earth, for providing a dry lime-free admixture composition when the lime-free admixture comprises liquid ingredients.

14. The cementitious composition according to claim 9 further comprising less than about 4.5 lbs of at least one water retention agent per, wherein said water retention agent is selected from the group consisting of isoprene polymer rubbers, isoprene copolymer rubbers, styrene-butadiene copolymer rubbers, polyvinyl acetate/vinyl versatate copolymers, polyethylene oxide polymers, hydroxylpropyl methyl cellulose polymers, hydroxylethyl methyl cellulose polymers, polyethylene glycol polymers, polyethylene glycol copolymers, polyacrylamide polymers, polyacrylamide copolymers, xanthan gums and guar gums, for reducing the amount of water that is added to the mixture comprising hydraulic cement, the plurality of aggregates and the lime-free admixture composition; and less than about 1.5 lbs of at least one pumping aid, wherein said pumping aid is selected from the group consisting of polyethylene oxide polymers, hydroxylpropyl methyl cellulose polymers, hydroxyl ethyl methyl cellulose polymers, polyethylene glycol polymers, polyethylene glycol copolymers, polyacrylamide polymers, polyacrylamide copolymers, xanthan gums, guar gums, for providing rheological control of the mixture comprising hydraulic cement, the plurality of aggregates, water and the lime-free admixture composition.

15. The cementitious composition according to claim 9 wherein said emulsifier is an emulsifier selected from the group consisting of linear alkyl benzene sulfonate salts of an alkali earth metal cation of the Group I and II elements, linear alkyl benzene sulfonate salts of a non-metal cation, alpha olefin sulfonate salts of an alkyl earth metal cation of the Group I and II elements, and alpha olefin sulfonate salts of a non-metal cation.

16. The cementitious composition according to claim 9 wherein said anionic surfactant is an anionic surfactant selected from the group consisting of a linear alkyl benzene sulfonate salt of an alkali earth metal cation, a linear alkyl benzene sulfonate salt of a non-metal cation, an alpha olefin sulfonate salt of an alkali earth metal cation, and an alpha olefin sulfonate salt of a non-metal cation.

17. The cementitious composition according to claim 9 wherein said alkali earth metal cation is an alkali earth metal cation selected from the group consisting of lithium, sodium, potassium, magnesium and calcium, and further wherein said non-metal cation is a non-metal cation selected from the group consisting of ammonium, alkyl ammonium, aryl ammonium, pyridine, pyrrole, piperidine, and pyridine.

18. The cementitious composition according to claim 9 wherein said toughening resin comprises water redispersible polymers.

19. The cementitious composition according to claim 18 wherein said water redispersible polymer is a redispersible polymer selected from the group consisting of vinyl acetate/vinyl versatate copolymers, ethyl vinyl acetate copolymers, polyvinyl acetate polymers and polyvinyl acetate copolymers.

20. The cementitious composition according to claim 9 wherein said accelerator is a thiosulfate salt of a cation selected from the group consisting of lithium, sodium, potassium, barium, calcium and ammonium.

21. The cementitious composition according to claim 9 wherein said accelerator is selected from the group consisting of dicumyl peroxide and benzoyl peroxide.

22. The method according to claim 3 further comprising the step of blending the admixture with cement, water, sand, and aggregates so as to form a cementitious composition and applying the cementitious composition to a substrate selected from te group consisting of construction block, brick, wood siding with mesh, steel with etched surfaces and mesh, concrete walls, sheet rock with mesh, foam board with mesh, foam board without mesh, and adobe.

* * * * *